United States Patent
Tsang

(10) Patent No.: US 7,556,205 B2
(45) Date of Patent: Jul. 7, 2009

(54) ADAPTABLE MEDIA CARD STORAGE DEVICE

(76) Inventor: Chun Chee Tsang, Room 2812, Metro Plaza, Tower II, 223, Kwai Fong, Hong Kong (CN)

( * ) Notice: Subject to any disclaimer, the term of this patent is extended or adjusted under 35 U.S.C. 154(b) by 196 days.

(21) Appl. No.: 11/325,559

(22) Filed: Jan. 4, 2006

(65) Prior Publication Data

US 2006/0144751 A1  Jul. 6, 2006

Related U.S. Application Data

(60) Provisional application No. 60/641,478, filed on Jan. 5, 2005.

(51) Int. Cl.
*G06K 7/00* (2006.01)

(52) U.S. Cl. .................. 235/486; 235/380; 235/492; 235/451

(58) Field of Classification Search ............ 235/486, 235/380, 451, 492, 441; 206/707, 701
See application file for complete search history.

(56) References Cited

U.S. PATENT DOCUMENTS

| | | | | |
|---|---|---|---|---|
| 5,038,250 | A * | 8/1991 | Uenaka et al. ............ 361/737 |
| 5,373,944 | A | 12/1994 | Ishitsuka |
| 5,441,150 | A * | 8/1995 | Ma .......................... 206/707 |
| 5,878,134 | A * | 3/1999 | Handelman et al. ......... 340/5.6 |
| 5,894,597 | A * | 4/1999 | Schwartz et al. ........... 455/558 |
| 5,933,328 | A * | 8/1999 | Wallace et al. ............ 361/737 |
| 6,137,710 | A * | 10/2000 | Iwasaki et al. .............. 365/52 |
| 6,230,885 | B1 | 5/2001 | Rochelo et al. |
| 6,275,383 | B1 | 8/2001 | Bohm |
| 6,341,693 | B2 | 1/2002 | Konno et al. |
| 6,443,306 | B1 | 9/2002 | Davies et al. |
| 6,520,329 | B1 | 2/2003 | Fuchs et al. |
| 6,715,795 | B2 | 4/2004 | Klure |
| 6,766,952 | B2 | 7/2004 | Luu |
| 7,017,809 | B2 * | 3/2006 | Korber et al. ............. 235/440 |
| 7,238,033 | B2 * | 7/2007 | Takagi ..................... 439/76.1 |
| 2001/0010984 | A1 * | 8/2001 | Bricaud et al. ............ 439/630 |
| 2002/0132528 | A1 * | 9/2002 | Harasawa et al. ......... 439/630 |
| 2004/0054863 | A1 | 3/2004 | Harada et al. |

FOREIGN PATENT DOCUMENTS

| | | |
|---|---|---|
| EP | 1365562 | 11/2003 |
| JP | 03027415 | 2/1991 |
| JP | 2001175821 | 6/2001 |
| JP | 2001195550 | 7/2001 |
| JP | 2001222695 | 8/2001 |
| JP | 2002166987 | 6/2002 |

* cited by examiner

*Primary Examiner*—Edwyn Labaze
(74) *Attorney, Agent, or Firm*—Patricia A. Mathers

(57) ABSTRACT

Card storage device for storing and transporting multiple media cards, the cards being of the same type or of different types. The card storage device has an adaptable media-card holder that allows the user to configure the storage device for specific types of media cards. The media-card holder includes an outer frame and middle and inner auxiliary frames that are optionally inserted into the outer frame. The outer frame provides a storage space for a large type of media card. The auxiliary frames provide secure storage space for one or more smaller media cards.

10 Claims, 6 Drawing Sheets

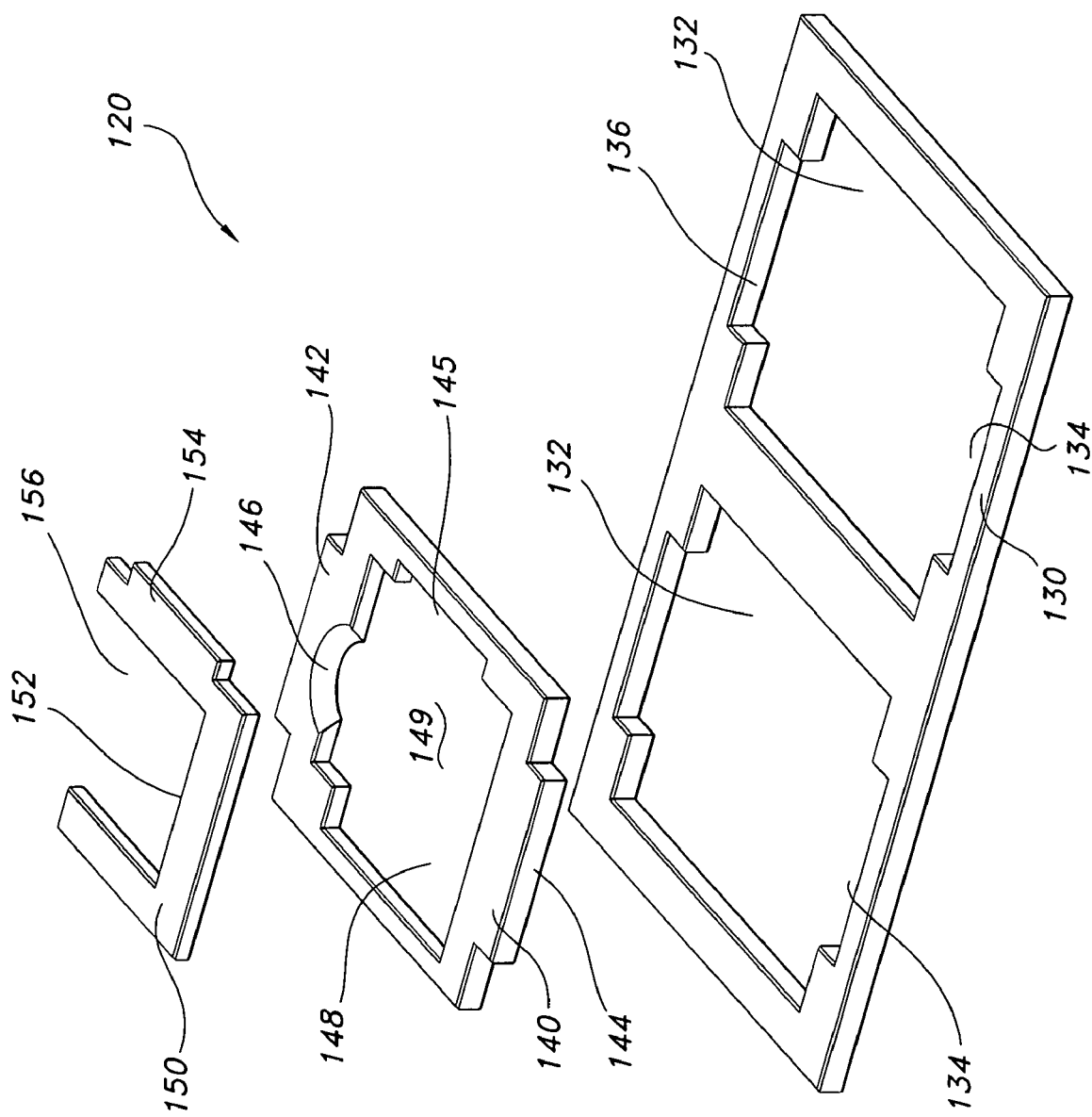

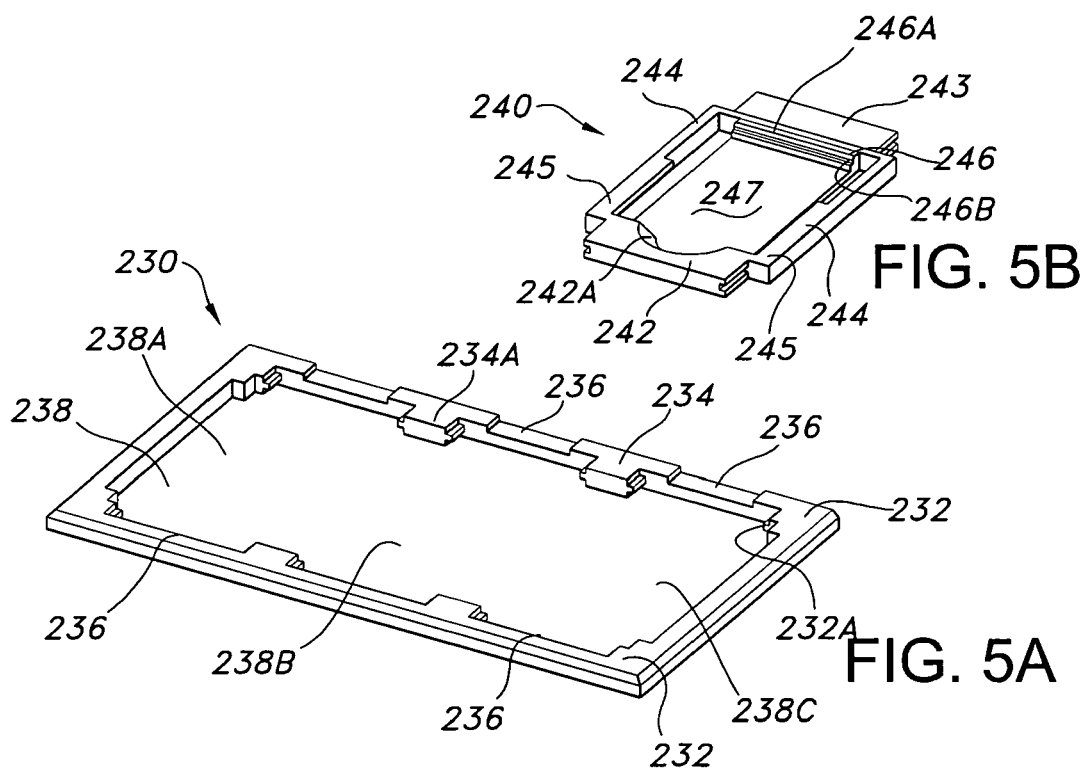
FIG. 5B
FIG. 5A
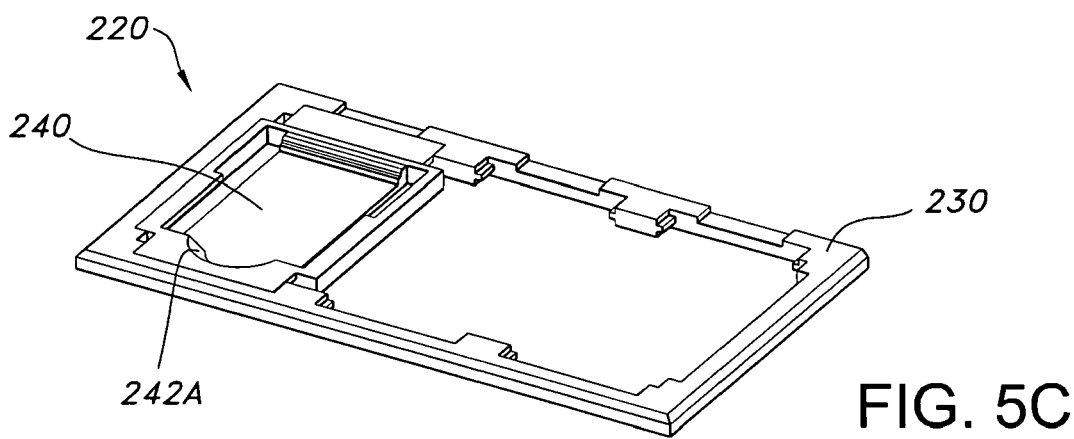
FIG. 5C
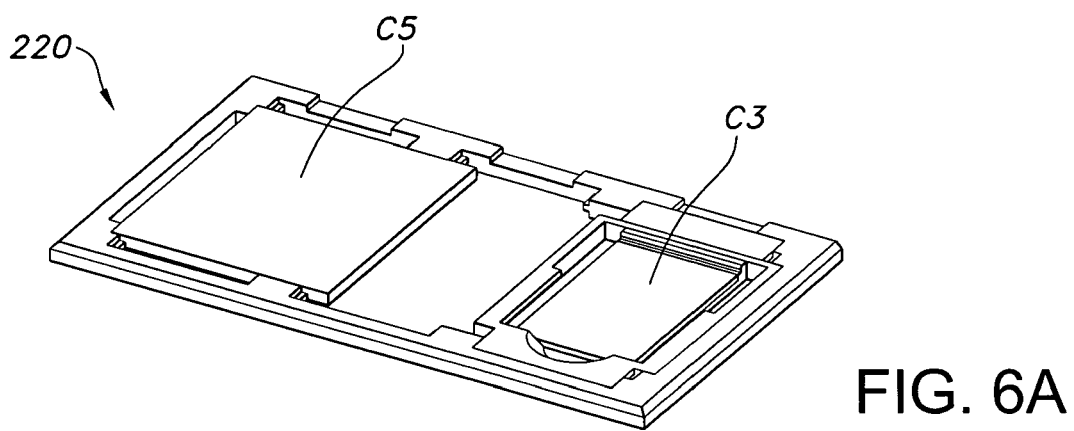
FIG. 6A

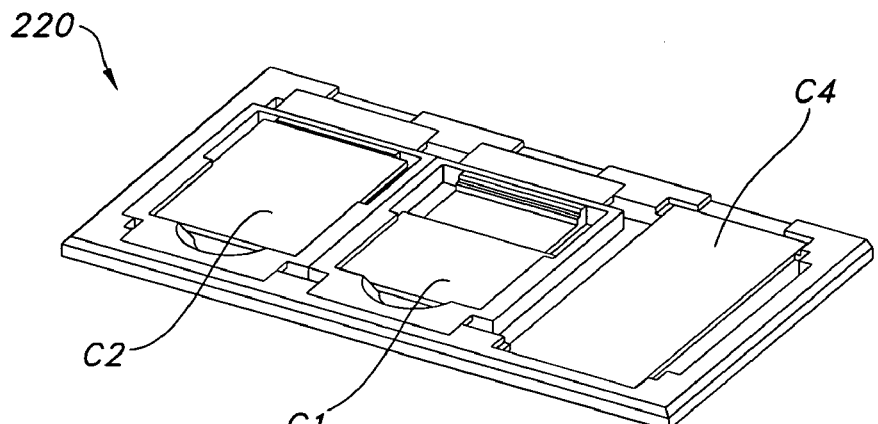
FIG. 6B
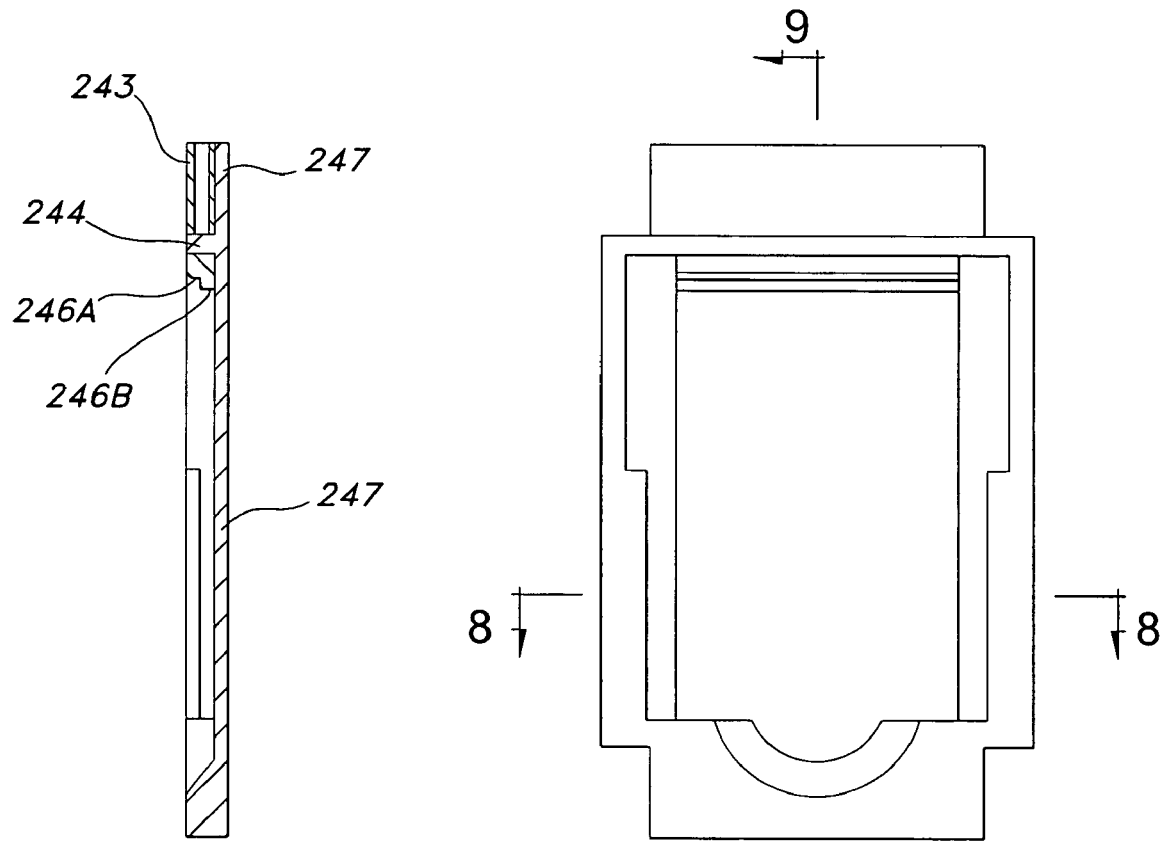
FIG. 9
FIG. 7
FIG. 8

ADAPTABLE MEDIA CARD STORAGE DEVICE

BACKGROUND INFORMATION

1. Field of the Invention

The invention relates to the field of storage devices for small flat objects. More particularly, the invention relates to holders used to store electronic media or memory cards.

2. Description of the Prior Art

Interchangeable or plug-in data or memory cards are currently known and in use with many types of electronic devices. Such cards are referred to hereinafter as "media cards" and the term shall refer in general to small, portable electronic plug-in cards for storing data and/or software, as well as for storing memory (integrated circuits). The media cards are used, for example, in portable telephones, desktop and portable computers, personal digital assistants (PDAs) and digital cameras. Examples of conventional electronic media cards include subscriber identity module (SIM) cards, multimedia memory cards (MMC's), secure digital (SD) cards, SmartMedia™ cards, the memory sticks, xD picture cards, and compact flash memory (CF) cards. The conventional media card is small and flat, but each type of media card has unique dimensions, varying in size, capacity, and function. The media card is interchangeable and easily removable from the device with which it is used. Due to its size, it is easily transportable. As with all electronic storage media, care must be taken in their storage and handling. The use of small handheld electronic devices is growing rapidly, resulting in a rapid proliferation of new and dimensionally unique media cards. A card user frequently carries multiple media cards of various types, either because the user needs to store large amounts of data, uses multiple electronic devices, each of which uses a specific type of card, or needs to keep data separate. For example, the user may carry two SIM cards which contain an access code and charge code for a portable cellphone, one SIM card for charging calls to a business account and the other one for charging calls to a personal account, another and different type of card for storing digital photographs, and yet another type of card for storing data and/or software for use with a PDA.

Users often transport these cards because the data contained therein needs to be used on non-local devices, or because the electronic devices themselves are mobile. A problem with storing and carrying plug-in media cards is that their small size renders them easily misplaced and damaged.

Numerous disclosures have attempted to provide adequate and secure means of transport and protection of the memory cards. U.S. Patent Application Publication 6,443,306 (Davies et al., 2003) discloses a jewel case carrier with a foam insert. Pre-cut cutout sections in the foam comprise a secure means to hold a media card. U.S. Pat. No. Publication 6,275,383 B1 (Böhm, 2001) discloses a holder of credit card size with a protective casing. The holder has guides for the insertion of media cards and pawls or nubs to hold the cards in place. Japan Patent Application Publication JP 2001175821 (Tetsuya, 2001) discloses a storage holder in the size and specification of a conventional computer disk. Card of various sizes are able to slide into and be held in pre-formed slots. U.S. Pat. No. Publication 6,766,952 (Luu, 2004) discloses a means to store one or more integrated circuit plug-in cards in a carrier that is snap-on or slide-on attachable to a portable device, or that forms a protective pocket. Integrated circuit plug-in cards are able to slide into the protective carrier slot.

These holders all have a disadvantage in that they are not adaptable or reconfigurable. Each of the disclosed holders is pre-configured for use with a specific shape and size of card and does not provide a means for a holder to be reconfigured to accommodate the various and changing data storage needs of the user.

What is needed, therefore, is a holder that transports media cards compactly and securely. What is further needed is such a holder that is configured to simultaneously hold a plurality of media card types. What is yet further needed is such a holder that is quickly and easily reconfigurable to accommodate new and differently dimensioned media cards.

BRIEF SUMMARY OF THE INVENTION

For the reasons cited above, it is an object of the present invention to provide a compact and secure holder for media cards. It is a further object to provide such a holder that is configured to simultaneously hold a plurality of media card types. It is a yet further object to provide such a holder that is quickly and easily reconfigurable to accommodate new and differently dimensioned media cards.

The objects of the invention are achieved by providing a card storage device that includes an adaptable media card holder and a protective enclosure. The holder is capable of storing a plurality of media cards, of the same or of different types. Such media cards include, but are not limited to, subscriber identity module (SIM) cards, multimedia memory cards (MMC's), secure digital (SD) cards, SmartMedia™ cards, memory sticks, xD picture cards, and compact flash memory (CF) cards. New types of media cards continue to be developed and appear on the market. The adaptable media card holder according to the invention provides the desired adaptability to also accommodate future new and/or different media cards.

The protective enclosure may be any suitable enclosure that is suitable for holding the adaptable media card holder and protecting the media card or cards. The key features of the protective enclosure are that it effectively protects the media card(s) from damage, whether from being dropped or being carried in a trouser pocket along with other objects, and provides means for easy storage and retrieval of the cards in the enclosure. Thus, the protective enclosure may be a clamshell type case, an etui or a sleeve with a closure means, such as a zipper or hook-and-loop fabric closure. The adaptable media card holder may be fixedly mounted or be loosely placed in the protective enclosure. An example of a well-suited type of protective enclosure is that of a clamshell type case with hinged top and bottom shells or panels, or a case with hinged front and back panels. Preferably, the protective case is constructed of a rigid material, such as a metal, plastic, or other form-rigid material that provides the necessary rigidity and strength to protect the media card from damage.

The adaptable media card holder has a frame that receives and securely holds one or more media cards. The frame is constructed of a rigid material and is a multi-part frame, having at least an outer frame and one or more auxiliary frames that nest within the outer frame and are removable from the outer frame as needed. The auxiliary frames are keyed to fit securely within a portion of the outer frame, similar to the inter-locking of a jigsaw puzzle, yet are easily removed or reinserted. Each frame forms a cavity of a certain size, capable of holding at least one media card of certain dimensions. The outer frame, with the auxiliary frames removed, provides storage space for larger media cards, while the auxiliary frames provide storage space for smaller media cards. Depending on the particular type of media card to be stored, the auxiliary frames are inserted or removed from the outer frame to provide the storage space to accommodate the particular media card. An adaptable media card holder having a relatively large outer frame with several relatively small auxiliary frames side by side accommodates a plurality of media cards, of the same or of different dimensions. For example, an xD picture card may rest in a cavity created by an auxiliary frame. If one removes the auxiliary frame, the larger cavity now provided may hold an SD memory card and a Memory Stick Duo card. The frames are constructed with recesses that facilitate grasping the frames or the media card stored within. The media card is typically placed into the properly sized cavity and pressed gently into place in the frame. The card is removed simply by grasping it with a thumb and forefinger and lifting it from the cavity.

BRIEF DESCRIPTION OF THE DRAWINGS

The present invention is described with reference to the accompanying drawings. In the drawings, like reference numbers indicate identical or functionally similar elements.

FIG. 2 is an exploded view of the card storage device of FIG. 1, showing the storage of two different cards.

FIG. 5A is a perspective drawing of the outer frame of the card storage device of FIG. 4.

FIG. 5B is a perspective view of the inner frame of the card storage device of FIG. 4.

FIG. 5C shows the inner frame inserted with the outer frame of the card storage device of FIG. 4.

FIG. 6A illustrates the storage of a CF and Memory Stick Duo media card.

FIG. 6B illustrates the storage of a SD media card, an xD picture card, and a Memory Stick card.

FIG. 7 is a plane view of the inner frame.

FIG. 8 is a cross-sectional view of the first inner frame end of the second embodiment.

FIG. 9 is a cross-sectional view of the second inner frame end of the second embodiment.

DETAILED DESCRIPTION OF THE INVENTION

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art. These drawings are not drawn to scale.

Note: Many briefcases, wallets, etc. provide compartments for storing credit cards and since people generally carry their wallets with them, the ability to store media and data storage devices in these compartments is desirable. For this reason, the size of the card storage devices according to the invention described below is approximately that of a credit card, although it is understood that the size of the card storage device is not a limitation.

Figure 1:
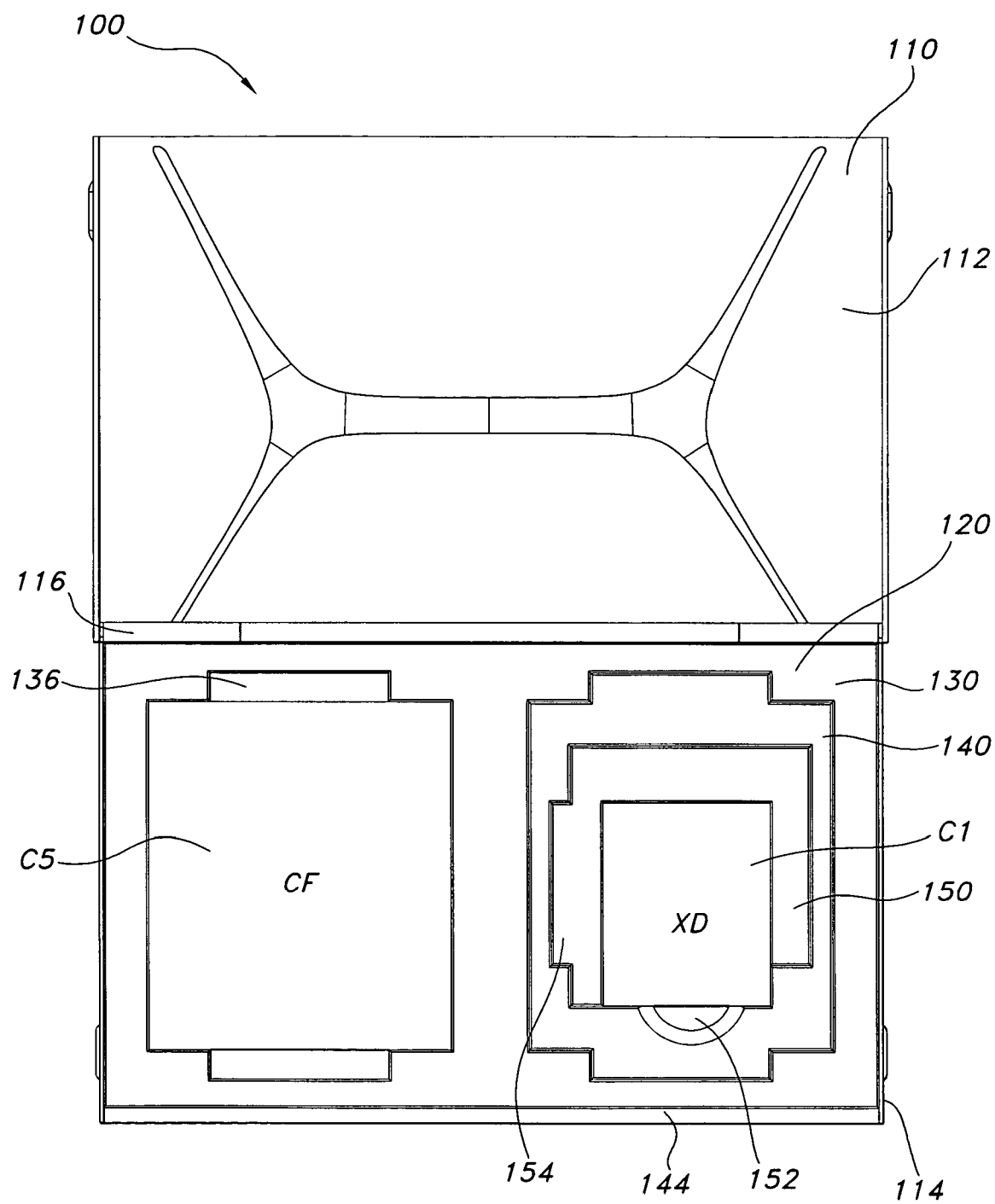
FIG. 1 is a top view of a first embodiment of the card storage device according to the invention.

FIG. 1 is a top view of a first embodiment of a card storage device 100 according to the invention. The card storage device 100 comprises an adaptable media card holder 120 and a protective enclosure 110. The adaptable media card holder 120 is constructed to securely hold a conventional plug-in data, memory, or media card C of the type typically used with small handheld electronic devices, such as PDAs, cellular telephones, digital cameras, digital music players, etc., as well as desktop and portable computers. In the embodiment shown, an xD picture card C1 and a CF card C5 are stored. Other examples of storing specific types of media cards C are shown below. The protective enclosure 110 shown in FIG. 1 is a clamshell type case with a top shell 112, a bottom shell 114, and a hinge 116 pivotally connecting the two shells. The adaptable media card holder 120 is fixedly mounted in the bottom shell 114. The particular construction of this enclosure 110 is shown for purposes of illustration only. The enclosure 110 may be any suitable enclosure that is suitable for holding the adaptable media card holder 120 and protecting the media card C. Thus, the protective enclosure may also be an etui or a sleeve. The adaptable media card holder 120 may be fixedly mounted or be loosely placed in the protective enclosure 110.

FIG. 2 is an exploded view of the adaptable media card holder 120, which includes an outer frame 130 and one or more auxiliary frames. In this first embodiment, the auxiliary frames include a middle frame 140 that nests within the outer frame 130, and an inner frame 150 that nests within the middle frame 140. As shown, the middle frame 140 and the inner frame 150 are separate and removable or insertable pieces. Depending on the particular media card C that is to be stored in the adaptable media card holder 120, one or both of the frames 140, 150 are removed to accommodate the geometry of the media card C. Thus, two media cards C of different types can be stored simultaneously within the same adaptable media card holder 120. The outer frame 130, with the middle frame 140 and the inner frame 150 removed, provides a frame cavity 132. Two frame cavities 132A, 132B are provided in the embodiment shown, although it is understood that any number of cavities may be provided, the number depending, of course, on the overall size of the adaptable media card holder 120.

The middle frame 140 and the inner frame 150 are keyed, so that when inserted into the adaptable media card holder 120, they are located in a particular space and securely held in place. The middle frame 140 has a first key 142 and a second key 144 that fit respectively into a first recess 136 and a second recess 134 in the outer frame 130. The middle frame 140 has a middle frame cavity 148 that is defined by the frame 140 and a middle frame floor 149.

The inner frame 150 nests inside the middle frame 140. The inner frame 150 is a three-sided structure with an inner frame cavity 156, an inner frame key 154, and an inner frame finger recess 152. The middle frame 140 has a middle frame recess 145 for receiving the inner frame key 154 to locate the inner frame 150 within the adaptable media card holder 120.

Figure 3A:
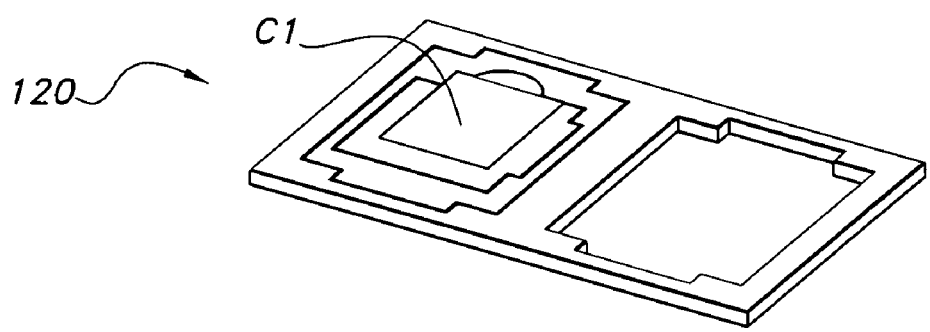
FIG. 3A illustrates the storage of an xD card.
Figure 3B:
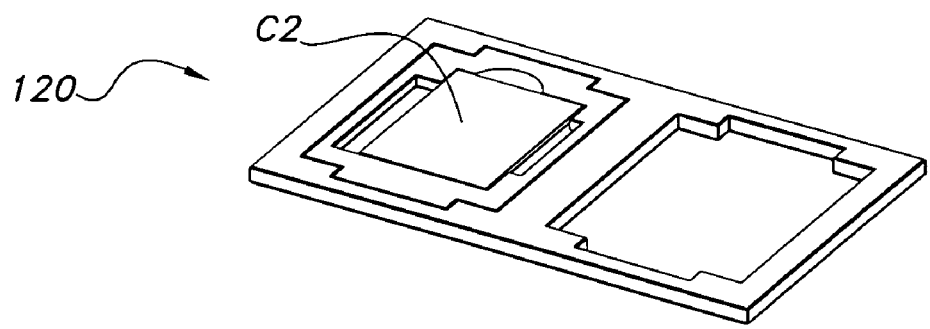
FIG. 3B illustrates the storage of an SD media card.
Figure 3C:
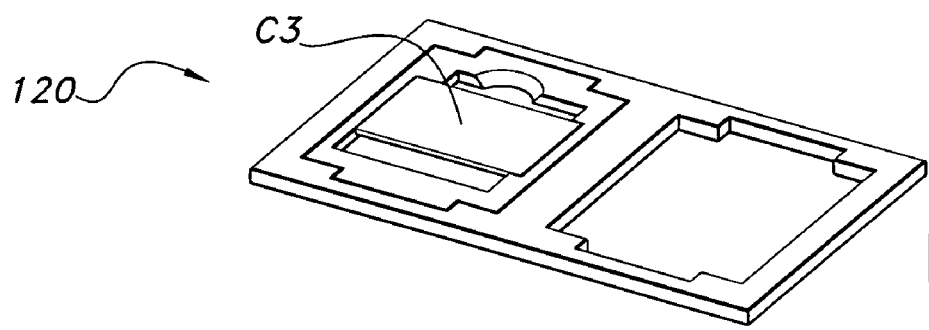
FIG. 3C illustrates the storage of a Memory Stick Duo media card.
Figure 3D:
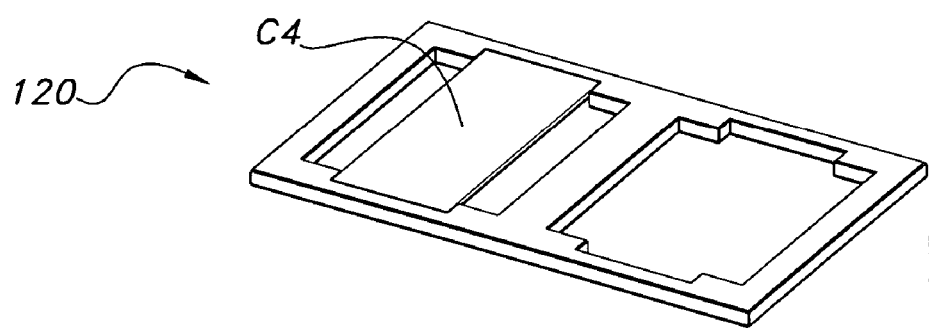
FIG. 3D illustrates the storage of a Memory Stick media card.
Figure 3E:
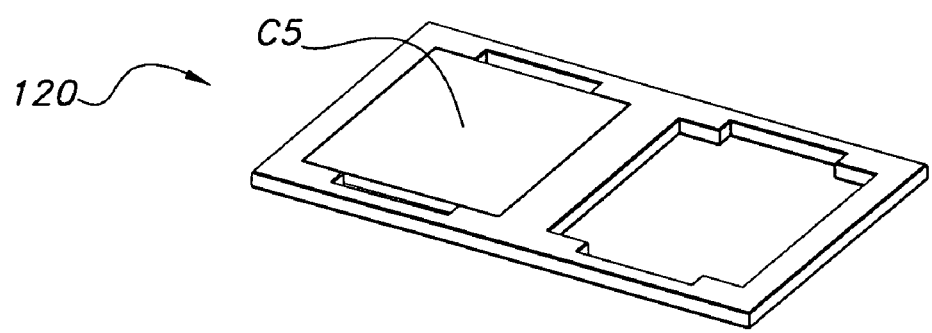
FIG. 3E illustrates the storage of a CF media card.

FIGS. 3A-3E illustrate various configurations of the adaptable media card holder 120, adapted to hold a particular media card C. FIG. 3A shows an xD picture card C1, which is a small media card, held within the inner frame 150. The xD picture card C1 rests on the middle frame floor 149 (not shown in this view) so that its upper surface is flush with that of the inner frame 150. The inner frame finger recess 152 allows the user to easily remove the xD picture card C1 from the inner frame cavity 56. FIG. 3B shows an SD memory card C2 stored within the middle frame 140, with the inner frame 150 removed. FIG. 3C shows a Memory Stick Duo card C3 stored within the middle frame 140. FIG. 3D and FIG. 3E show respectively a Memory Stick media card C4 and a CF card C5 stored within the outer frame 130, with the middle frame 140 removed. The two media cards C4 and C5 have different dimensions, yet are both storable in the same outer frame cavity 132.

Figure 4:
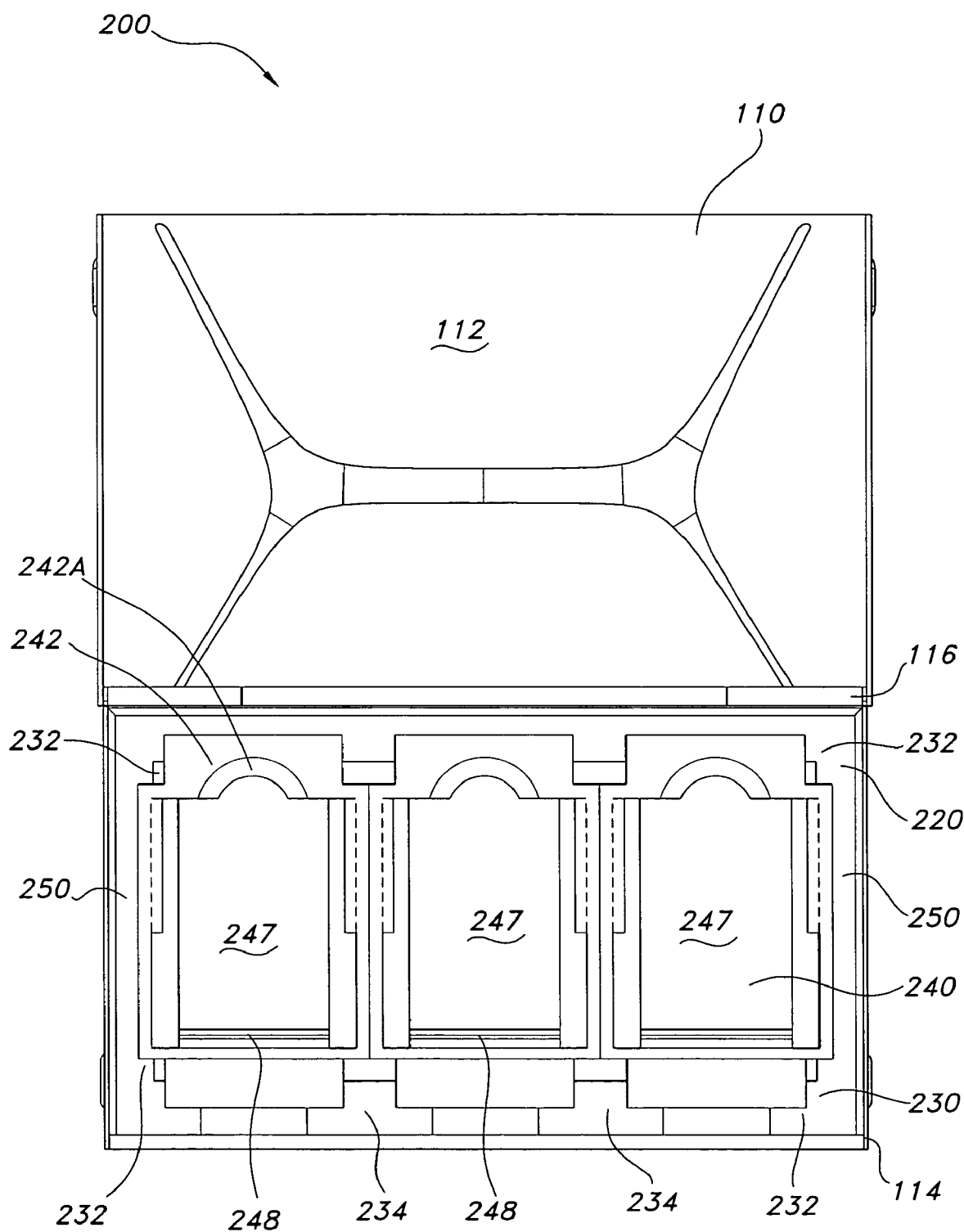
FIG. 4 is a top view of the second embodiment of the card storage device according to the invention.

FIG. 4 is a perspective drawing of a second embodiment of a card storage device 200 according to the invention. The card storage device 200 comprises an adaptable media card holder 220 and the protective enclosure 110 described above. The adaptable media card holder 220 comprises an inner frame 240 that nests inside an outer frame 230. As with the card storage device 110 described above, the scope of the invention is not limited to the number of media cards C shown in the illustrations. Rather, the number of media cards C that the card storage device 200 may hold depends on the size and the particular configuration of the card storage device 200.

FIG. 5A-FIG. 5C show the adaptable media card holder 220 with greater detail, FIG. 5A illustrating details of the outer frame 230, FIG. 5B illustrating details of the inner frame 240, and FIG. 5C showing the inner frame 240 inserted into the outer frame 230. The outer frame 230 has a plurality of corner keys 232 and a plurality of center keys 234, that form a corresponding plurality of outer frame recesses 236. Each of the corner keys 232 has a step 232A, and each of the center keys has a step 234A, as shown in FIG. 5A. The keys 232 and 234 and recesses 236 define the corner boundaries of cavities 238. In the particular embodiment shown, the cavities 238 include three cavities 238A, 238B, and 238C. The inner frame 240 has an inner frame floor 247, two lateral rails 244, a first inner frame end 242 with a finger recess 242A, and a second inner frame end 243. The first inner frame end 242 serves as a key and fits into the recess 236. The second inner frame end 243 also serves as a key that fits into the recess 236 opposite that of the first inner frame end 242 and also has a stepped short rail 246 that forms a series of steps 246A and 246B between the floor 247 and the upper surface of the inner frame 240. A retainer bar 245 is formed along a portion of each of the lateral rails 244 for holding the media card C within the adaptable media card holder 200. Finger grips 248 (shown only in FIG. 4) are providing in the short rail 246.

FIG. 6A illustrates the storage of a CF card C5 and a Memory Stick Duo card C3 in the adaptable media card holder 220.

FIG. 6B illustrates storage of an SD card C2, an xD card C1, and a Memory Stick card C4 in the adaptable media card holder 220.

FIG. 7 is a place view of the inner frame. FIG. 8 is a cross-sectional view of the first inner frame end 242, showing the finger grip 242A, the retainer bars 245, the lateral rails 244, and the floor 247 and FIG. 8 a cross-sectional view of the second inner frame end 243, showing the profile of the short rail 246.

The scope of the invention encompasses a card storage device that stores any number of media cards. The Figures show configurations of the card storage devices 100 and 200 that are approximately the size of a credit card. It is within the scope of the invention, however, to provide card storage devices that are larger and, accordingly, are configured to carry more that the two or three media cards shown herein.

It is understood that the embodiments described herein are merely illustrative of the present invention. Variations in the construction of the card storage device may be contemplated by one skilled in the art without limiting the intended scope of the invention herein disclosed.

What is claimed is:

1. A storage device for media cards, said storage device comprising:
a protective enclosure and a media-card holder contained within said protective enclosure, said media-card holder having retainer means for adaptably reconfiguring a storage space so as to selectively provide at least two configurations of storage space, one configuration being adapted to securely hold a first media card having a first shape, and another configuration being adapted to securely hold a second media card having a second shape, said first shape being different from said second shape;
wherein said retainer means comprises an outer frame and an auxiliary frame, wherein said auxiliary frame is removably insertable into said outer frame, and wherein, when said auxiliary frame is removed from said outer frame, said media-card holder provides storage for a first configuration of said media cards and, when said auxiliary frame is inserted into said outer frame, said media-card holder provides storage capability for a second configuration of said media cards, said first configuration including storage capacity for one or more of said media cards having said first shape and said second configuration including storage capacity for one or more of said media cards having said second shape.

2. The storage device of claim 1, wherein said retainer means includes said outer frame and a plurality of auxiliary frames, and wherein any number of said plurality of auxiliary frames is optionally insertable into said outer frame, thereby providing storage for multiple sub-configurations of said first configuration.

3. The storage device of claim 2, wherein said plurality of auxiliary frames encompasses two such auxiliary frames that are optionally insertable into said outer frame.

4. The storage device of claim 2, wherein said plurality of auxiliary frames encompasses three such auxiliary frames.

5. The storage device of claim 1, wherein said auxiliary frame further comprises a middle frame that fits within said outer frame and an inner frame that fits within said middle frame, wherein storage for said second configuration is provided when said middle frame is inserted into said outer frame and said inner is removed from said media-card holder, and wherein a third configuration of media card storage is provided when said inner frame is inserted into said middle frame, said third configuration including storage capacity for one of more media cards of third selected types of said various types of media card, wherein said third configuration includes at least one type of media card that is not included within said second configuration.

6. The storage device of claim 5, wherein said middle frame includes a plurality of middle frames and said inner frame includes a plurality of inner frames that corresponds in number to said plurality of middle frames.

7. The storage device of claim 5, wherein any number of said plurality of middle frames is optionally insertable into said outer frame, thereby providing storage for multiple sub-configurations of said second configuration.

8. The storage device of claim 7, wherein any number of said plurality of inner frames is optionally insertable into said plurality of middle frames, thereby providing storage for multiple sub-configurations of said third configuration.

9. The storage device of claim 1, wherein said protective enclosure is a clamshell case.

10. The storage device of claim 1, wherein said protective enclosure is a sleeve.

* * * * *